(12) United States Patent
Miyake

(10) Patent No.: US 6,760,294 B2
(45) Date of Patent: Jul. 6, 2004

(54) OPTICAL PICKUP DEVICE

(75) Inventor: Takahiro Miyake, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 185 days.

(21) Appl. No.: 09/911,118

(22) Filed: Jul. 23, 2001

(65) Prior Publication Data

US 2002/0009039 A1 Jan. 24, 2002

(30) Foreign Application Priority Data

Jul. 24, 2000 (JP) .................................... 2000-222036

(51) Int. Cl.⁷ ............................................ G11B 7/00
(52) U.S. Cl. ......................... 369/112.01; 369/112.23; 369/44.23
(58) Field of Search .................... 369/44.41, 44.11, 369/44.27, 44.23, 112.01, 112.16, 110.01, 112.23

(56) References Cited

U.S. PATENT DOCUMENTS 5,493,554 A * 2/1996 Sasaki et al. .......... 369/112.17
5,559,787 A * 9/1996 Nomoto ................. 369/112.02

FOREIGN PATENT DOCUMENTS

| JP | 06-168451 | 6/1994 |
| JP | 11-31337 | 2/1999 |
| JP | 11-339305 | 12/1999 |
| JP | 2000-123399 | 4/2000 |
| JP | 2000-268386 | 9/2000 |

OTHER PUBLICATIONS

Japan Patent Office Office Action dated Sep. 16, 2003 (2pp.) for application No. 2000–222036 with English Translation (2 pp.).

* cited by examiner

*Primary Examiner*—Muhammad Edun
(74) *Attorney, Agent, or Firm*—David G. Conlin; George W. Hartnell, III; Edwards & Angell, LLP

(57) ABSTRACT

Light emitted from a semiconductor laser is converted by a collimator lens into a collimated light, which enters into an objective lens of high NA and forms a condensed spot within an optical disk. The light emitted from the semiconductor laser is S-polarized light that oscillates in a direction perpendicular to the plane of incidence.

10 Claims, 8 Drawing Sheets

RADIAL DIRECTION

TRACK DIRECTION

28 DEGREES

OPTICAL PICKUP DEVICE

BACKGROUND OF THE INVENTION

1. Field of the Invention

The present invention relates to an optical pickup device for use in an optical reproducing apparatus for reproducing information from a playback-only optical disk such as compact disk or laser disk, or in an optical recording/reproducing apparatus for recording/reproducing information on/from a write once, read many or rewritable optical disk.

2. Description of the Background Art

Generally, light intensity profile on the exit pupil of an objective lens for focusing a light beam onto a recording surface of a recording medium largely affects a spot size to be focused, and has a great influence on the performance of the optical pickup device.

It is known that the spot size being formed relies on a numerical aperture (NA) of the objective lens, oscillation wavelength $\lambda$ of light, and lens rim intensity ("Rim", a ratio of the rim intensity with respect to the center intensity). When the radius of the condensed beam having the center intensity of at least $1/e^2$ is represented as "r", if Rim=1.0 (i.e., the lens incident intensity is uniform through the surface), the radius "r" can be expressed as the following expression (1):

$$r=0.41\lambda/NA \qquad (1).$$

Thus, in order to reduce the beam spot size, it is necessary to decrease the oscillation wavelength $\lambda$ of the light and to increase NA of the objective lens.

Further, the expression (1) above holds only when Rim=1. It is well known that the beam spot size will become larger than in expression (1) when Rim becomes less than 1.0.

Thus, in order to reduce the beam spot size, it is considered that it is preferable to increase the lens rim intensity (Rim) so as to achieve uniform intensity distribution of the lens incident light down to the periphery of the lens.

In the optical pickup, it is also preferable that the light irradiated from a light source, e.g., a laser diode (LD), is coupled to the objective lens with the least possible loss.

If the coupling efficiency is increased, however, the lens rim intensity (Rim) is decreased, resulting in the light intensity profile as shown in FIG. 5(d). Referring to FIG. 5(e) illustrating the light intensity profile on the exit pupil at this time, a ratio of the light intensity at the peripheral portion with respect to that at the central portion within the diameter of clear aperture is decreased. Thus, as shown in FIG. 5(f), the light spot being condensed on the recording surface of the recording medium has a large diameter, which causes modulation transfer function (MTF) to be degraded in the high-frequency region. It means that resolution of a level required for reproduction cannot be obtained.

Conventionally, in order to prevent degradation of the resolution, an optical system is configured to have a relatively large lens rim intensity (Rim). Thus, although the coupling efficiency is lowered to some extent as shown in FIG. 5(a), the light intensity profile on the exit pupil becomes approximately uniform, as shown in FIG. 5(b), since the light intensity ratio of the peripheral portion with respect to the center portion within the diameter of the pupil is increased. Accordingly, the light spot size being focused onto the recording surface of the recording medium becomes small, as shown in FIG. 5(c), and therefore, the resolution of a level required for reproduction is achieved.

As described above, in the optical pickup, the light intensity profile within the diameter of the pupil can be made relatively even by setting the coupling efficiency as low as possible and increasing the lens rim intensity (Rim). This allows optimization of the light spot on the recording surface of the recording medium.

However, in the optical system above, when the polarized direction of the light incident on the disk is taken into account, polarized light (S-polarized light) that is perpendicular to the disk incident plane is more likely to generate reflected light called Fresnel reflection as the angle of incidence to the disk increases. This causes loss of the light to be transmitted into the disk.

In particular, when the light focused with the objective lens is being incident on the disk, the light from a portion closer to the periphery of the lens has a larger angle of incidence to the disk. The light from the outermost peripheral portion exhibits an angle of incidence corresponding to NA of the lens ($\sin^{-1}$ (NA)).

Thus, the loss of the light to be transmitted to the disk is increased as it is closer to the periphery of the lens, and the resultant Rim becomes smaller.

Conventionally, the disk surface is not provided with anti-reflection coating or the like considering cost and other factors. Thus, the light from the objective lens is likely to reflect on the disk surface, with its reflectance being varied dependent on the polarized direction of the light.

In general, it is known that the reflectance of a glass material to which no anti-reflection coating is applied varies dependent on the angle of incidence and the direction of polarization of the light. A relation between the reflectance and the angle of incidence when light with oscillation wavelength of 655 nm enters into a disk substrate having refractive index of n=1.51 is shown in FIG. 7.

As seen from FIG. 7, the reflectance increases as the angle of incidence increases. Further, the S-polarized light with respect to the disk substrate exhibits larger reflectance than the P-polarized light.

FIG. 6 shows a specific structure of an optical pickup device for use in a magneto-optical disk recording/reproducing apparatus representing a conventional optical information recording/reproducing apparatus.

Collimator lens 5 in FIG. 6 converts the light beam with wavelength of 655 nm emitted from a semiconductor laser, or laser diode, 1 into a collimated beam. Objective lens 8 is a condensing lens having NA of 0.47, which focuses the light beam onto a recording surface of magneto-optical disk 9.

The operation of a conventional optical information recording/reproducing apparatus will now be described with reference to the structure above. The light beam emitted from semiconductor laser 1 is turned into a collimated beam by collimator lens 5, and then focused with objective lens 8 onto the recording surface of magneto-optical disk 9. At this time, in the optical pickup, the coupling efficiency is set to the lowest possible level and the lens rim intensity (Rim) is set to the greatest possible value to realize relatively uniform light intensity profile within the diameter of the pupil, such that the light spot on the recording surface of the recording medium is optimized.

The angle of incidence $\theta$ at the time when the light emitted from objective lens 8 enters into optical disk 9 becomes greater as it is from the position closer to the periphery of the lens. If NA is 0.47, $\theta$ becomes at most $\sin^{-1}$ (0.47)=28 degrees. In this case, as shown in FIG. 7, the reflection on the disk surface does not vary whether the light is the P-polarized light or the S-polarized light, and the reflectance is extremely small.

Thus, there is almost no loss of the light at the time of incidence on the disk, and the light can be condensed with the Rim almost as designed.

However, with a high-density magneto-optical disk recording/reproducing apparatus currently under development, it is attempted to obtain an even smaller spot size by increasing the NA of the objective lens and reducing the wavelength of the laser diode. Accordingly, application of an objective lens with NA of 0.65 or greater, for example, has been taken into account.

With the lens whose NA is 0.65, the angle of incidence θ at the time when the light emitted from the objective lens enters into the disk would become at most $\sin^{-1}(0.65)=40.5$ degrees. In this case, as seen from the graph of FIG. 7, the reflection on the disk surface greatly varies between the P-polarized light and the S-polarized light, and the reflectance of the S-polarized light becomes considerably large.

Thus, there is a large amount of loss of the S-polarized light at the time of incidence onto the disk, and Rim becomes smaller in the S-polarized direction. The resulting beam spot is thus elongated in the S-polarized direction.

As a result, despite the increase of NA of the objective lens, the condensed beam spot of a desired size cannot be formed within the optical disk. This hinders increase of the recording density and makes it difficult to obtain reproduced signals in good condition.

These problems are profound especially when an objective lens of high NA with an increased light incident angle is employed.

As a countermeasure against these problems, Japanese Patent Laying-Open No. 11-31337 discloses application of anti-reflection coating onto a disk surface. This however increases the cost, and also poses other problems. Specifically, as the angle of incidence of the light entering into the disk varies from 0 degree to $\sin^{-1}(NA)$ degrees, it is necessary to apply anti-reflection coating with extensive coverage, which makes fabrication of the coating as well as increase of yields thereof difficult.

SUMMARY OF THE INVENTION

The present invention is made to solve the above-described problems, and its object is to reduce the size of a beam-condensed spot on a recording medium by reducing the spot diameter in a desired direction (a radial direction or track direction when the recording medium is a disk), without forming anti-reflection coating on the surface of the recording medium, thereby enabling high-density recording in the relevant direction.

According to an aspect of the present invention, the optical pickup device includes light generating means and an objective lens for focusing light emitted from the light generating means onto a recording surface of a recording medium, wherein the oscillation direction of wavefront of the light incident on the objective lens is made equal to the radial direction of the recording medium.

According to another aspect of the present invention, the optical pickup device includes light generating means and an objective lens for collimating light emitted from the light generating means onto a recording surface of a recording medium, wherein the oscillation direction of wavefront of the light incident on the objective lens is made equal to the track direction of the recording medium. The track direction is a direction that intersects with the radial direction at right angles.

The numerical aperture (NA) of the object lens is preferably at least 0.65. The recording medium preferably has data formed of pits. The recording medium may be a phase change recording medium or may be a magneto-optical recording medium.

If intensity distribution of the light incident on the objective lens is in the form of an ellipse, the major axis direction of the ellipse is preferably equal to the oscillation direction mentioned above.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
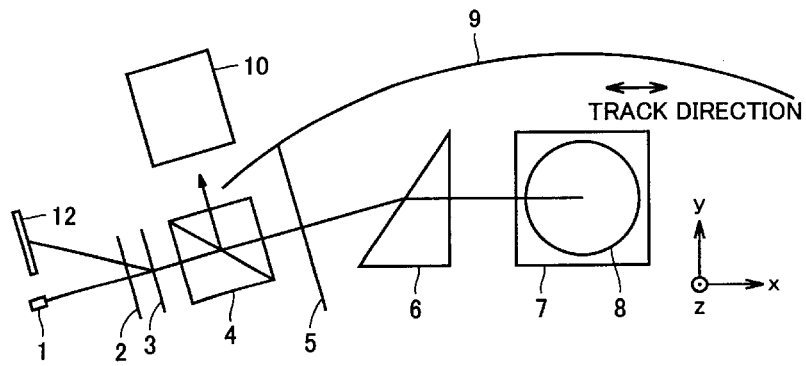
FIG. 1A is a plan view and FIGS. 1B and 1C are side views showing a schematic structure of an optical pickup device according to a first embodiment of the present invention.

Hereinafter, embodiments of the present invention will be described with reference to the drawings, through which the same or corresponding components are denoted by the same reference characters.

First Embodiment

Figure 1B:
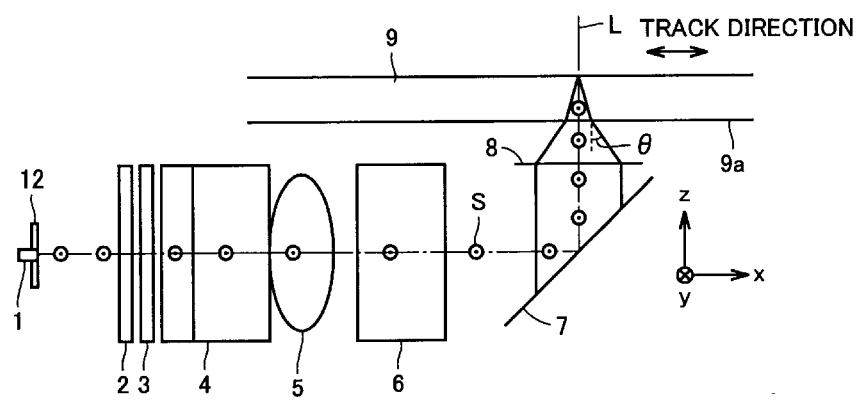
Figure 1C:
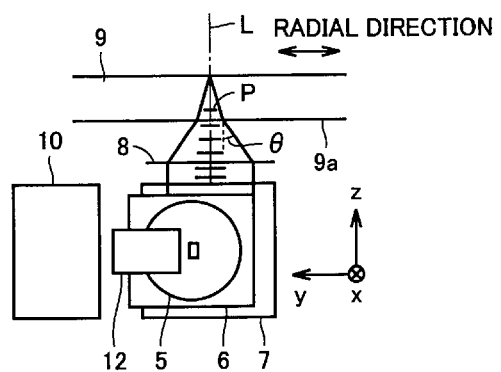

FIGS. 1A, 1B and 1C are schematic diagrams of the optical pickup device according to the first embodiment of the present invention, of which FIG. 1A is a plan view and FIGS. 1B and 1C are side views thereof.

The optical pickup device of the present embodiment employs an objective lens of high NA. It attempts to increase the disk recording density, in particular by making the diameter in a radial direction of the light spot on the disk as small as possible and by making the track width thereon as narrow as possible.

Referring to FIG. 1A, light emitted from a semiconductor laser 1 as light generating means is divided by a first diffraction element 2 into 0th-order light and ±1st-order lights forming a main-spot and two sub-spots on a disk. The light is then transmitted through a second diffraction element 3 and a beam splitter 4, and turned into a collimated light by a collimator lens 5. The light is then magnified by a shaping prism 6, and enters via a raised mirror 7 into an objective lens 8 of high NA (e.g., NA: 0.65), and forms a condensed light spot within an optical disk 9 as a recording medium. Cross-section intensity distribution of the light immediately after being converted to the collimated light by collimator lens 5 forms an ellipse. It is preferable that shaping prism 6 magnifies the minor axis direction of the ellipse such that the ellipse ideally approximates to a perfect circle. This leads to an advantage that, when focused with the objective lens, the condensed beam forms a small, almost perfect circle.

At the time of magnification, however, the shaping prism does not necessarily need to achieve the perfect circle. If the original ellipse is transformed to a shape closer to the perfect circle at any rate, the beam spot created will become smaller and closer to the perfect circle.

A similar effect can be expected if the optical system is configured such that shaping prism 6 contracts the major axis direction of the ellipse of the cross-section intensity distribution of the light immediately after being converted to the collimated light, to make it approximate to a perfect circle or a shape that is at least closer to the perfect circle than the original ellipse.

The reflected light from optical disk 9 is converted again to the collimated light by objective lens 8, and contracted and shaped by shaping prism 6. The light is then passed through collimator lens 5, and a portion of the light is reflected by beam splitter 4 and directed to a signal detecting system 10 for reproducing signals of optical disk 9. At this time, if optical disk 9 is formed of a magneto-optical medium, signal detecting system 10 is formed of an analyzer for reproducing the signals of the magneto-optical disk using magneto-optical effects, a photo detector for converting the light into electrical signals, and other components. This magneto-optical signal detecting system reproduces information recorded on magneto-optical disk 9.

The light transmitted through beam splitter 4 is diffracted by diffraction element 3. The 1st-order diffracted lights are received at photo detector 12, and servo signals (focus error signal: FES, track error signal: TES) are detected.

If the optical disk is a phase change disk or a pit disk, photo detector 12, or signal detecting system 10 receiving the reflected light from beam splitter 4 can reproduce the information signals.

Now, a relation between the disk and the polarization direction of the light in the present invention will be described.

Referring to FIG. 1B, the light emitted from semiconductor laser 1 is S-polarized light that oscillates backwards and forwards with respect to the paper plane of the figure. In FIG. 1C wherein the same pickup is seen from a side of FIG. 1B, the light emitted from semiconductor laser 1 is regarded as P-polarized light that oscillates from side to side with respect to the paper plane of the figure.

In the present embodiment, the oscillation direction of wavefront of the light incident on objective lens 8 is made equal to the radial direction of optical disk 9. In this particular case, all that is need to control the oscillation direction of the wavefront of the light in such a manner is just to arrange the semiconductor laser such that the oscillation direction of the light emitted therefrom becomes parallel to the disk surface. This is because the oscillation direction of light emitted from a semiconductor laser is uniquely determined.

In FIG. 1B, the light collected by objective lens 8 and incident on the disk surface 9a becomes the S-polarized light, which is more likely to reflect as it is more distant from the optical axis L of the condensed beam. In the vicinity of the optical axis with an angle of incidence of 0 degree, the reflectance is approximately 5%. At the outermost peripheral portion, the incident angle $\theta = \mathrm{Sin}^{-1}(0.65) = 40.5$ degrees, and the reflectance becomes approximately 9% from FIG. 7. It means that Rim of the light incident on the disk is decreased by 9%−5%=4% compared to Rim of the light emitted from the objective lens.

When observed from the FIG. 1C side, the light focused by objective lens 8 and entering into disk surface 9a is the P-polarized light. In this case, as seen from FIG. 7, the reflectance of the light decreases as it deviates farther from the optical axis L and the disk incident angle increases. The light from the outermost peripheral portion enters into the disk with an incident angle of $\theta = \mathrm{Sin}^{-1}(0.65) = 40.5$ degrees, and the reflectance becomes approximately 2%. That is, Rim of the disk incident light is increased by 5%−2%=3% compared to Rim of the light emitted from the objective lens.

Accordingly, in this optical pickup, Rim of the disk incident light observed from the FIG. 1B side is decreased by 4%+3%=7% compared to Rim of the disk incident light observed from the FIG. 1C side.

Figure 2A:
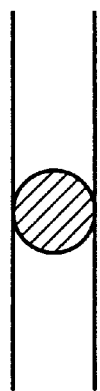
FIGS. 2A–2D show beam spots on an optical disk to illustrate the spots formed by the optical pickup device of the first embodiment.
Figure 2B:
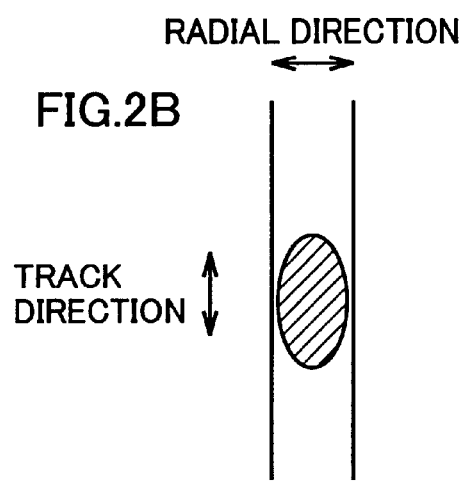

Reference is now made to FIG. 2A showing the shape of a light spot obtained when the light converged by the objective lens is ideally focused without any loss. By comparison, FIG. 2B shows the shape of the light spot of the present embodiment that takes into consideration the actual reflection on the disk surface. The light spot obtained in the present embodiment has an advantage that it can be focused into a shape that is shorter in the disk radial direction and longer in the track direction.

Figure 7:
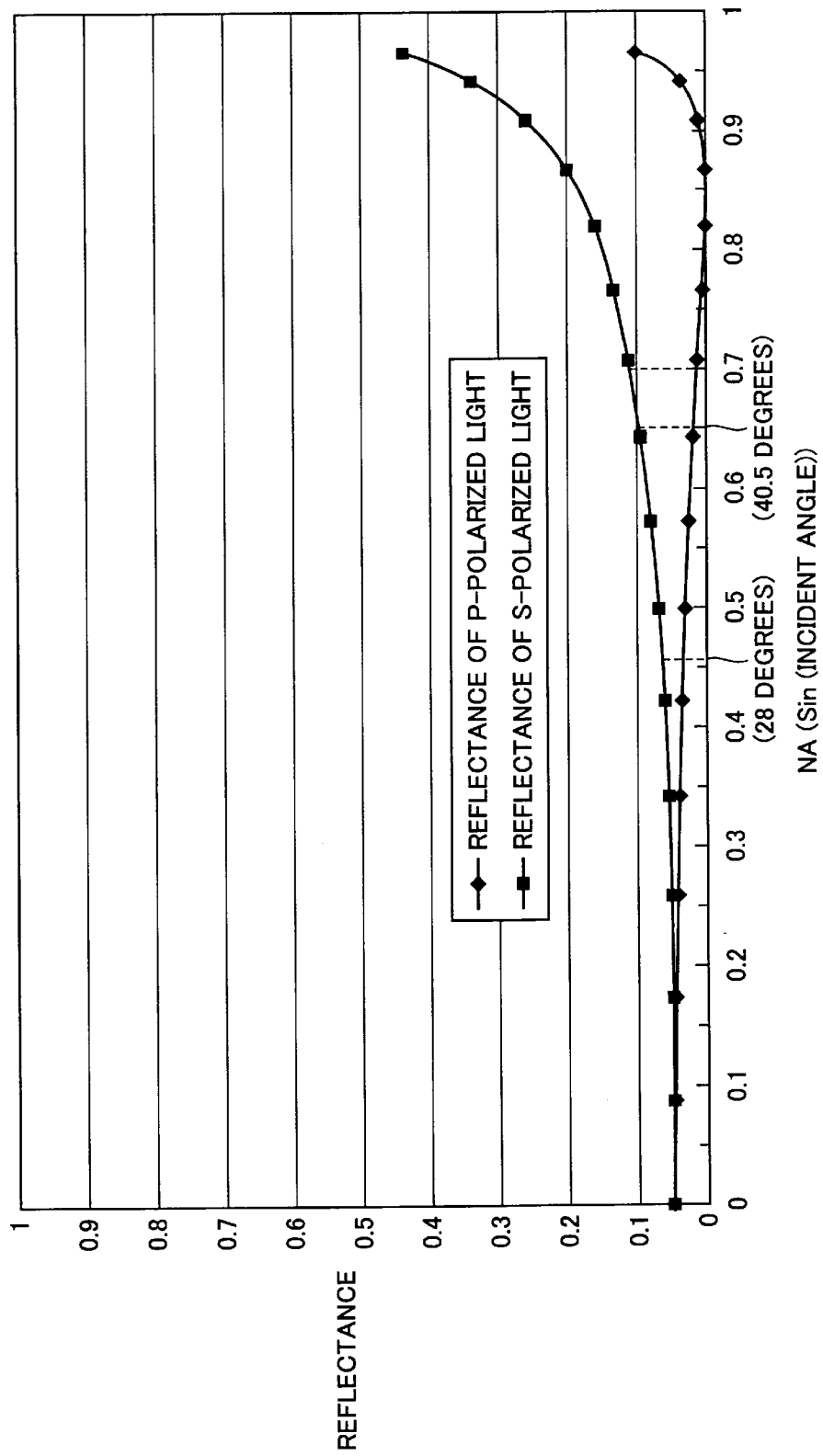
FIG. 7 illustrates a relation between disk incident angle and reflectance of polarized lights.
Figure 8:
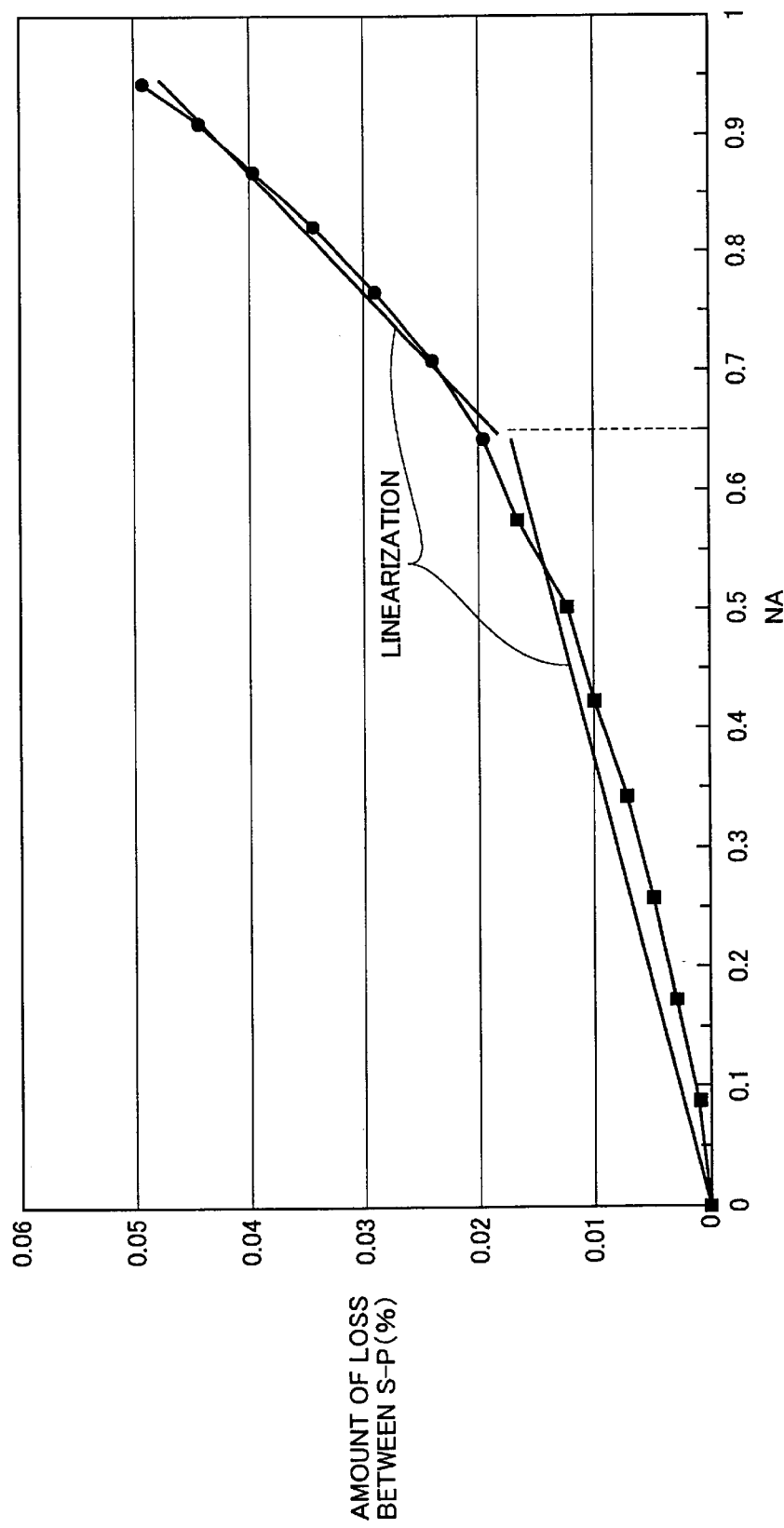
FIG. 8 illustrates increasing rates of differences between P-polarized light and S-polarized light shown in FIG. 7.

Such an effect is more remarkable as the NA of the objective lens is increased, as shown in FIG. 8. In FIG. 8, increasing rates of differences between the reflectance of the S-polarized light and the reflectance of the P-polarized light, obtained from the data of FIG. 7, are plotted and linearized with two straight lines. As seen from FIG. 8, the increasing rates change in slope with NA of approximately 0.65 as a point of inflection, and they increase with NA of greater than 0.65.

This shows that the pickup device described above is more advantageous when the NA of the objective lens is at least 0.65.

Figure 2C:
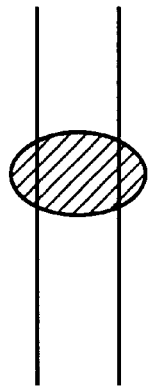
Figure 2D:
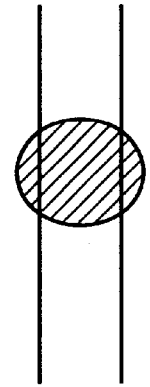

In the pickup of the present embodiment, beam shaping has been conducted and the intensity distribution of the light incident on the objective lens has been made to form a perfect circle. However, if the beam-shaping ratio is small and the intensity distribution of the light incident on the lens is in the form of an ellipse, or even if the beam shaping is not effected, the similar effects that Rim in the radial direction is increased and Rim in the track direction is decreased can be expected. Thus, compared to the light spot of the ellipse shape longer in the radial direction, shown in FIG. 2C, that is obtained when the light collected by the objective lens is ideally focused without any loss, the light spot obtained is elongated in the track direction, but not in the disk radial direction, as shown in FIG. 2D.

Accordingly, the condensed beam spot can be narrowed in the radial direction to the level that can be achieved by focusing in an ideal manner without taking the disk into account. Thus, even if the track pitch on the disk is narrowed in the radial direction, data on the adjacent tracks are prevented from being wrongly read out, so that an optical pickup allowing high-density recording/reproduction can be realized.

Considering reflection of the light focused on optical disk 9, reflection loss is more serious as the reflected light in the track direction is closer to the periphery. Thus, when the intensity distribution of the light incident on objective lens 8 is in the form of an ellipse, if the track direction is along the minor axis direction of the ellipse-shaped intensity distribution, the amount of light that would be lost within the optical disk becomes small, since the light intensity is lower in the position closer to the periphery in the minor axis direction.

Accordingly, in the case where optical disk 9 is a pit disk or a phase change disk, the loss on optical disk 9 of the reflected light including the information signals can be minimized. Increase of the emittance power of semiconductor laser 1 for the purpose of compensation for the lost amount of light can also be restricted to the least possible level. This enables reduction of power consumption, allows cost cutting, and alleviates degradation of the reproduced signals.

In the case where optical disk 9 is a magneto-optical disk, the loss of the S-polarized light generated by Kerr rotation due to the reflection on the optical disk can be reduced. Therefore, magneto-optical signals can be reproduced in good condition.

Second Embodiment

Figure 3A:
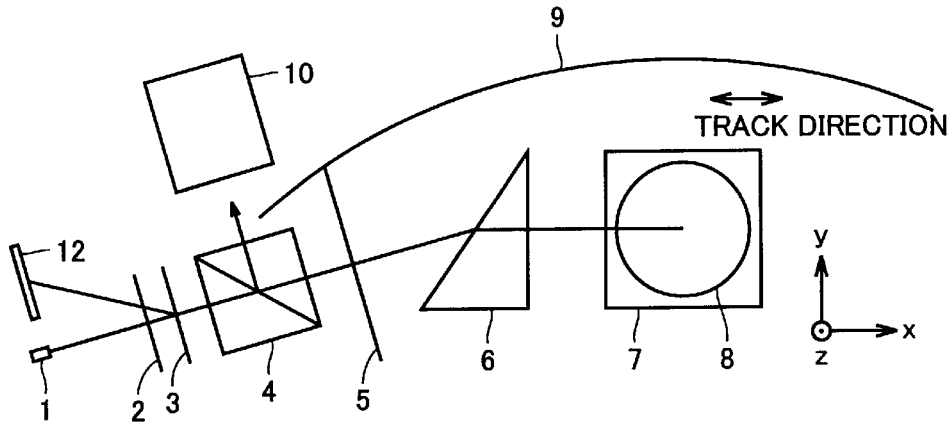
FIG. 3A is a plan view and FIGS. 3B and 3C are side views showing a schematic structure of an optical pickup device according to a second embodiment of the present invention.
Figure 3B:
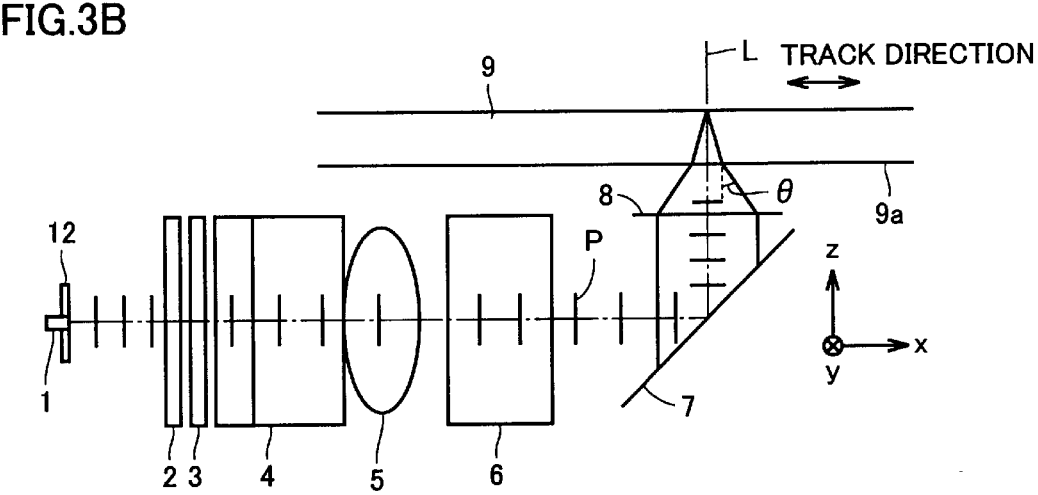
Figure 3C:
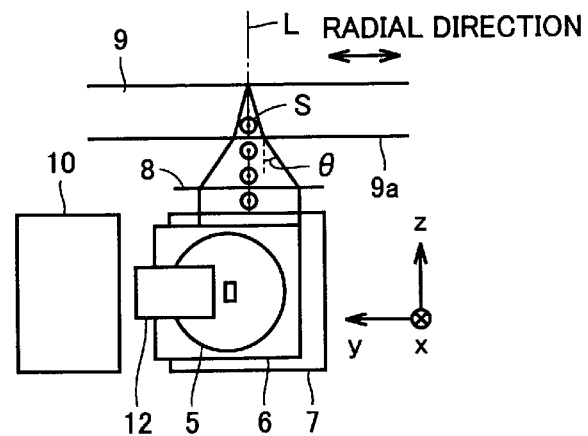

The second embodiment of the present invention will now be described. FIGS. 3A, 3B and 3C are schematic diagrams of the optical pickup device according to the second embodiment, of which FIG. 3A is a plan view and FIGS. 3B and 3C are side views thereof.

The optical pickup device of the present embodiment employs an objective lens of high NA, and attempts to improve the disk recording density. Specifically, the light spot being focused on the disk is made to have the smallest possible diameter in the track direction (the direction intersecting with the radial direction at right angles) to increase the data recording line density.

The structure of the optical pickup device shown in FIG. 3A is identical to that shown in FIG. 1A, and therefore, detailed description thereof is not repeated.

In the present embodiment, the oscillation direction of wavefront of the light incident on objective lens 8 is made equal to the track direction of optical disk 9. To control the oscillation direction of the wavefront of the light in this manner, the semiconductor laser is arranged such that the oscillation direction of the light emitted therefrom becomes perpendicular to the disk surface.

A relation between the optical disk and the polarized direction of the light in the present embodiment will now be explained.

Referring to FIG. 3B, light emitted from semiconductor laser 1 is P-polarized light that oscillates up and down with respect to the paper plane of the drawing. Accordingly, the light collected by objective lens 8 and incident on disk surface 9a becomes the P-polarized light in this paper plane. If the optical pickup device is seen from another side, as shown in FIG. 3C, the light emitted from semiconductor laser 1 and entering into objective lens 8 can be regarded as S-polarized light that oscillates backwards and forwards with respect to the paper plane of the drawing.

Accordingly, in FIG. 3C, the light collected by objective lens 8 and incident on optical disk surface 9a is the S-polarized light, which is more likely to reflect as it comes more distant from the optical axis L of the condensed beam. In the vicinity of the optical axis with the angle of incidence of 0 degree, the reflectance is approximately 5%. At the outermost peripheral portion, the incident angle $\theta=\mathrm{Sin}^{-1}$ (0.65)=40.5 degrees and the reflectance is about 9% from FIG. 7. It means that Rim of the disk incident light is decreased by 9%−5%=4% compared to Rim of the light emitted from the objective lens.

By comparison, in the side view shown in FIG. 3B, the light collected by objective lens 8 and incident on disk surface 9a is the P-polarized light, whose reflectance is decreased as it is farther away from optical axis L and the disk incident angle is increased, as seen from FIG. 7. At the outermost peripheral portion, the angle of incidence $\theta=\mathrm{Sin}^{-1}$ (0.65)=40.5 degrees, and the reflectance is approximately 2%. That is, Rim of the disk incident light is increased by 5%−2%=3% compared to Rim of the light emitted from the objective lens.

Accordingly, in this optical pickup device, Rim of the disk incident light observed from the FIG. 3C side is decreased by 4%+3%=7% compared to Rim of the disk incident light observed from the FIG. 3B side.

Figure 4A:
FIGS. 4A–4D show beam spots on an optical disk to illustrate the spots formed by the optical pickup device of the second embodiment.
Figure 4B:
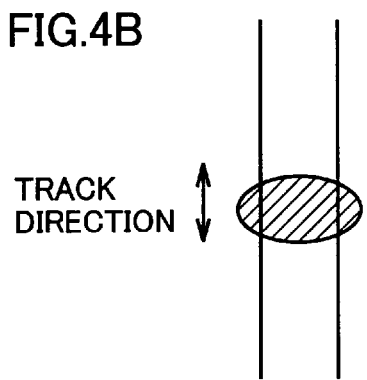

As a result, compared to the shape of the condensed spot shown in FIG. 4A that is obtained when the light collected by the objective lens is ideally focused without any loss, the shape of the condensed spot of the present embodiment with the actual disk surface reflection being taken into consideration becomes an ellipse as shown in FIG. 4B that is longer in the disk radial direction and shorter in the track direction.

Figure 4C:
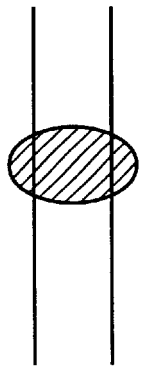
Figure 4D:
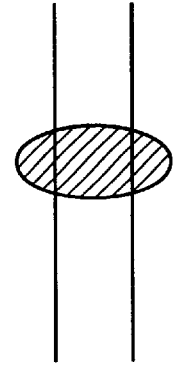
Figure 5:
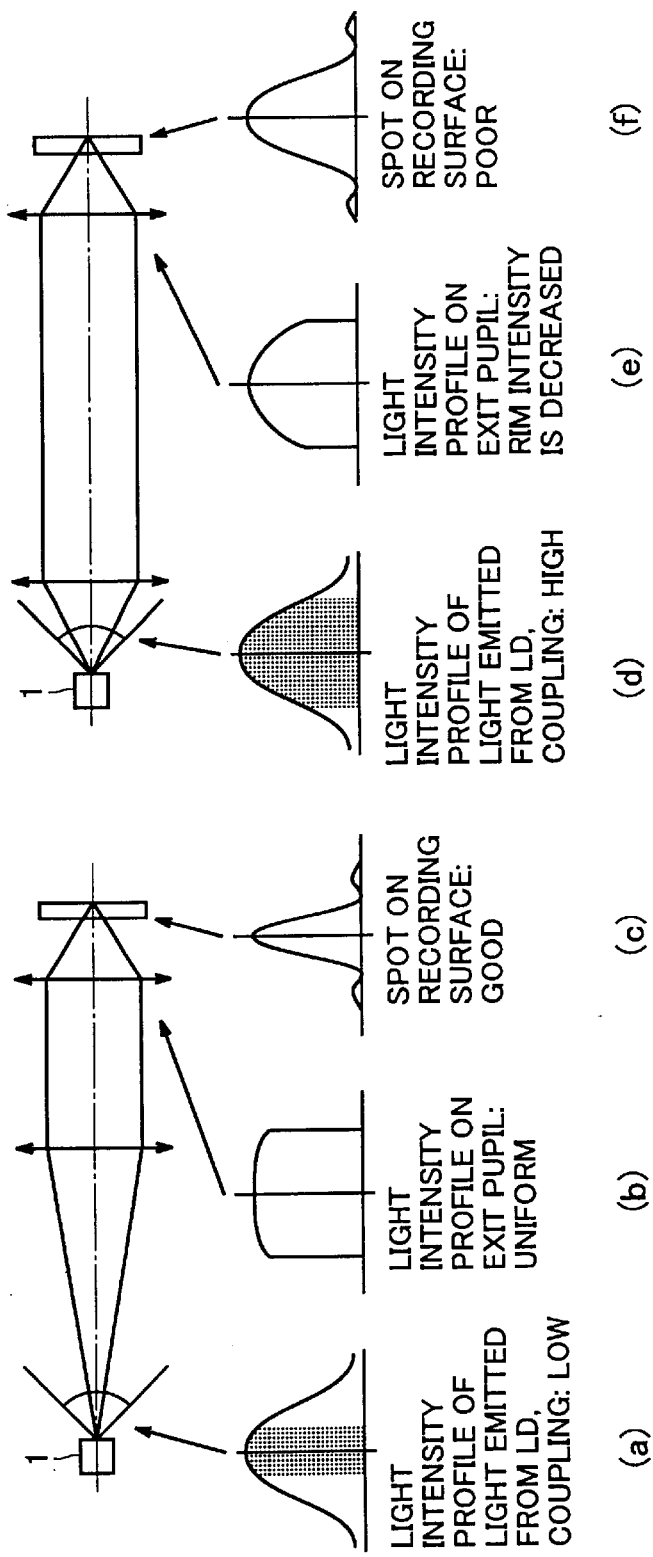
FIG. 5 illustrates designs of optical pickup devices.
Figure 6:
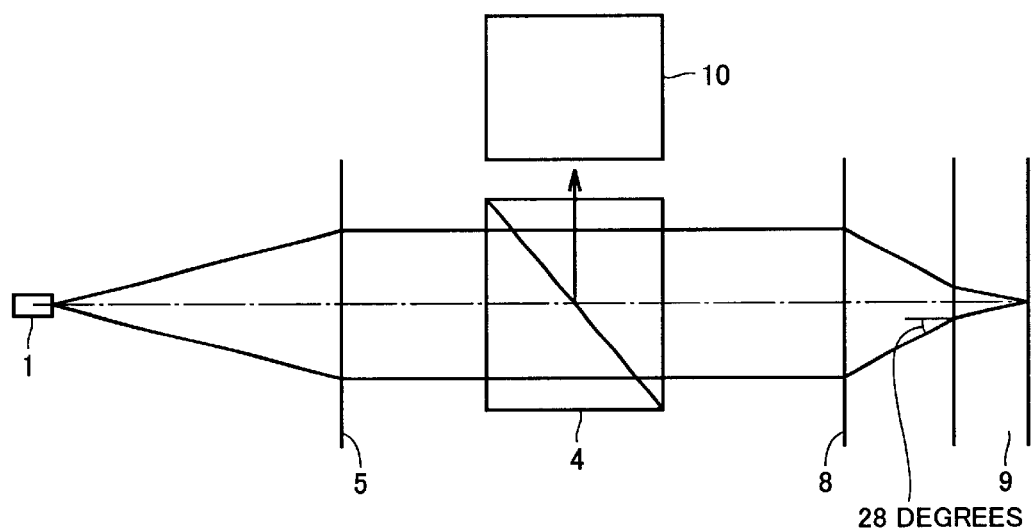
FIG. 6 shows a schematic structure of a conventional optical pickup device.

In the optical pickup of the present embodiment, the beam has been shaped and the intensity distribution of the light incident on the objective lens has been made to form a perfect circle. However, if the beam shaping ratio is small and the intensity distribution is in the form of an ellipse, or even if the beam shaping is not effected, the similar effect that Rim in the radial direction is decreased can be obtained. Thus, compared to the ellipse-shaped light spot elongated in the radial direction, shown in FIG. 4C, that is obtained when the light collected by the objective lens is ideally focused without any loss, the resulting spot, shown in FIG. 4D, is further elongated in the radial direction, while the diameter in the disk track direction is unchanged.

Accordingly, the track recording density of the optical disk can be increased, and the degradation of modulation transfer function (MTF) in the high-frequency region is prevented. That is, the resolution of a level required for reproduction is ensured.

Considering reflection of the light focused on optical disk 9, the reflection loss is more serious as the reflected light in the track direction is closer to the periphery. Therefore, when the intensity distribution of the light incident on the objective lens is in the form of an ellipse, if the track direction is along the minor axis direction of the ellipse-shaped intensity distribution, the amount of light that would be lost at the optical disk becomes small, since the light intensity is lower in the position closer to the periphery in the minor axis direction.

Accordingly, in the case where optical disk 9 is a pit disk or a phase change disk, the loss at the disk of the reflected light including the information signals can be restricted to the minimum level, and the increase of the emittance power of semiconductor laser 1 for the purpose of compensation for the lost amount of light can also be minimized. This enables reduction of power consumption, allows cost cutting, and prevents degradation of the reproduced signals.

In the case where optical disk 9 is a magneto-optical disk, the loss of the S-polarized light generated by Kerr rotation due to the reflection on the optical disk can be reduced. Therefore, magneto-optical signals can be reproduced in good condition.

As explained above, according to the first aspect of the present invention, the oscillation direction of wavefront of the light incident on the objective lens is made equal to the radial direction of the recording medium. Thus, the size of the beam spot focused on the recording surface can be decreased by narrowing the diameter in the radial direction. Accordingly, even if the track pitch of the recording medium is narrowed in the radial direction, data on the adjacent tracks are prevented from being read out erroneously, and the high-density recording/reproduction in the radial direction is enabled.

According to the second aspect of the present invention, the oscillation direction of wavefront of the light entering into the objective lens is made equal to the track direction of the recording medium. Thus, the size of the condensed beam spot can be lessened in the track direction. Accordingly, the track recording density of the recording medium can be improved, and degradation of the modulation transfer function (MTF) in the high-frequency region is prevented. That is, the resolution of a level necessary for reproduction is ensured.

When the numerical aperture of the objective lens is at least 0.65, the widening of the condensed beam spot can be restricted more effectively, so that the recording density can further be improved.

When the data are formed of pits in the recording medium, the loss at the recording medium of the reflected light including the information signals can be minimized, and the increase of the emittance power of the light generating means for the purpose of compensation for the loss of the light can be restricted to the least possible level. Accordingly, it becomes possible to reduce power consumption, cut cost, and restrict degradation of the reproduced signals.

When the recording medium is a magneto-optical recording medium, the loss of the S-polarized light generated by Kerr rotation due to the reflection at the recording medium can be reduced, so that the magneto-optical signals in good condition can be reproduced.

In the case where the intensity distribution of the light incident on the objective lens is in the form of an ellipse, when the major axis of the ellipse is equal to the oscillation direction of the light, again, the loss at the recording medium of the reflected light including the information signals can be minimized, and the increase of the emittance power of the light generating means to compensate for the loss of the light can also be restricted to the minimum level. Accordingly, it is possible to reduce power consumption, cut cost, and alleviate degradation of the reproduced signals.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup device, comprising:

light generating means; and an objective lens for focusing light emitted from said light generating means onto a recording surface of a recording medium, said objective lens having a numerical aperture of at least 0.65, wherein an oscillation direction of wavefront of the light incident on said objective lens is identical to a radial direction of said recording medium.

2. The optical pickup device according to claim 1, wherein said recording medium has data formed of pits.

3. The optical pickup device according to claim 1, wherein said recording medium is a phase change recording medium.

4. The optical pickup device according to claim 1, wherein said recording medium is a magneto-optical recording medium.

5. The optical pickup device according to claim 1, wherein intensity distribution of the light incident on said objective lens is in the form of an ellipse, and a major axis direction of said ellipse is identical to said oscillation direction.

6. An optical pickup device, comprising:

light generating means; and an objective lens for focusing light emitted from said light generating means onto a recording surface of a recording medium, said objective lens having a numerical aperture of at least 0.65, wherein an oscillation direction of wavefront of the light incident on said objective lens is identical to a track direction of said recording medium.

7. The optical pickup device according to claim 6, wherein said recording medium has data formed of pits.

8. The optical pickup device according to claim 6, wherein said recording medium is a phase change recording medium.

9. The optical pickup device according to claim 6, wherein said recording medium is a magneto-optical recording medium.

10. The optical pickup device according to claim 6, wherein intensity distribution of the light incident on said objective lens is in the form of an ellipse, and a major axis direction of said ellipse is identical to said oscillation direction.

* * * * *